April 1, 1969  H. S. VAN BUREN, JR  3,436,108
FRACTIONAL TURN CLIP
Filed March 16, 1967

Inventor:
Harold S. van Buren Jr.,
By James R O'Connor
Atty.

United States Patent Office 3,436,108
Patented Apr. 1, 1969

3,436,108
FRACTIONAL TURN CLIP
Harold S. van Buren, Jr., Lexington, Mass., assignor, by mesne assignments, to United-Carr Incorporated, Boston, Mass., a corporation of Delaware
Filed Mar. 16, 1967, Ser. No. 623,586
Int. Cl. F16b 1/00, 3/00, 5/00
U.S. Cl. 287—189.35   6 Claims

ABSTRACT OF THE DISCLOSURE

A unitary clip having a flat base and a pair of laterally spaced, oppositely directed hooks which are adapted to be passed through an apertured panel and snapped over the sides of a rod, the base being disposed at an acute angle to the longitudinal axis of the rod. The base is thereafter rotated through a fractional turn until it lies generally parallel the longitudinal axis of the rod whereby the hooks are cammed over the surface of the rod remote from the panel and the base is locked against the panel surface remote from the rod.

Background of the invention

The clip was designed primarily to satisfy the need for a simple, inexpensive and highly efficient fastener for attaching thin, plastic panels or liners to the inside of the basket of the well-known supermarket shopping cart. The purpose of the liner, of course, being to prevent small articles from falling through the gaps between the horizontal and vertical rods which form the basket. However, it is envisioned that the clip could be utilized in any application wherein an apertured member is to be secured to a generally tubular structure, for example, it might well be employed to attach a sign or wind break to a chain link fence. In addition, the clip might also be used as a tubing, wiring or cable clamp in installations wherein an apertured panel is the base structure. In either of these broad classes of applications, the invention will function as a "blind" fastener, that is to say the side of the panel opposite that engaged by the base of the clip need not be available to effect the attachment.

The reader will further appreciate the invention's contribution to the art by having reference to U.S. Patent No. 2,362,679 (G. A. Tinnerman) which is typical of fasteners heretofore employed in the above-mentioned applications. While the attachment utilizing the present invention is effected by simply snapping the opposed hooks over the sides of the tubular member and rotating the clip through less than a quarter turn, with any simple tool such as a needle-nose pliers, to lock the base against the panel, the prior art fastener must be looped over the tubular memmer after which a screw is passed through the panel aperture and turned into the so-called speed nut. When a plastic panel or liner is to be attached, a load distributing washer is usually required to prevent fracturing or cracking of the edges of the panel adjacent the aperture by the screw head of the patented device. In an application such as that first mentioned above, it is highly undesirable to have the leading ends of a number of sheet metal screws protruding either inside or outside the market basket for obvious reasons. The present invention, which is smoothly contoured and present a very low profile adjacent both the apertured panel and the tubular member, substantially reduces the possibility of injury to either the person or apparel of the user of the cart or the articles deposited therein.

Summary of the invention

The invention is seen to lie in a unitary, resilient clip having a base and at least a pair of hooks which are so oriented with respect to each other and to the base that the fastening of an apertured panel and a tubular member can be rapidly effected without sacrificing the strength or holding power characteristic of the prior art. Further appreciation of the specific features of the invention in which novelty is seen to abide will be had from a reading of the following detailed description in conjunction with a viewing of the accompanying drawing.

Description of the preferred embodiment

Figure 1:
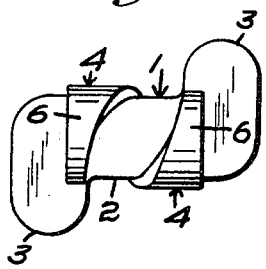
FIGURE 1 is a top plan view of a clip according to the invention.
Figure 2:
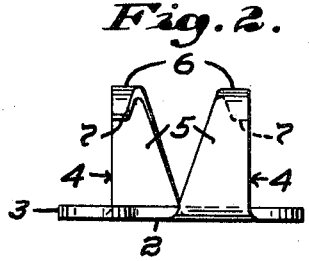
FIGURE 2 is a side elevation of the clip.
Figure 3:
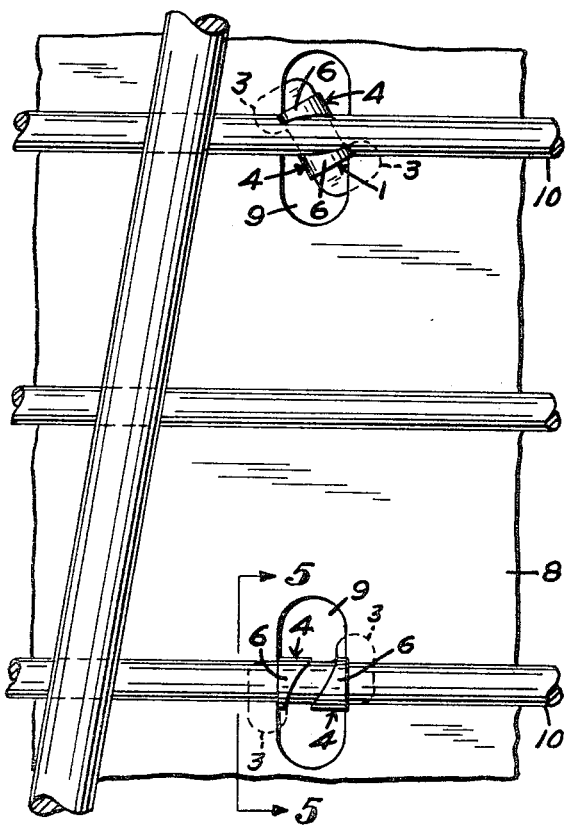
FIGURE 3 is a plan view of an installation depicting a fragmentary section of a slotted panel secured to the inside of a fragmentary portion of a shopping cart basket. In the upper portion of the figure a clip according to the invention is shown in its initial position of engagement with a horizontal rod of the basket. The lower portion of the figure shows the clip in the locked position with respect to the rod and panel.
Figure 4:
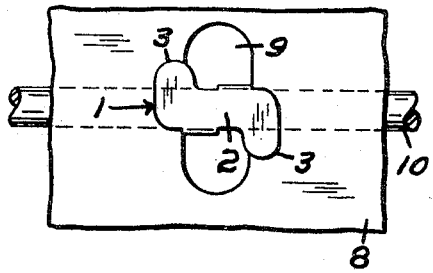
FIGURE 4 is a reduced plan view looking on the lower portion of FIGURE 3 from the rear of that figure.
Figure 5:
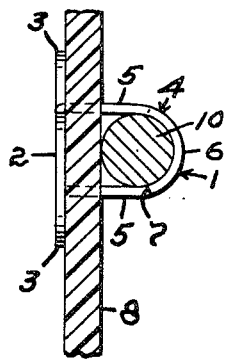
FIGURE 5 is a section taken on line 5—5 of FIGURE 3.

Referring to FIGURES 1 and 2 specifically, the clip 1 depicted therein is of resilient, sheet metal construction and includes a flat, generally rectangular base 2 having a pair of integral, planar tabs 3 extending in opposite directions from the sides of the base adjacent the ends thereof, and a pair of integral hooks 4 extending upwardly from the opposite side edges of the base 2 and overlying one surface of the base in spaced relationship thereto. Each of the hooks 4 has a lower straight portion 5 which is generally perpendicular to the base 2, an upper arcuate portion 6 and a free end 7 which extends downwardly from the arcuate portion 6 toward the plane of the base 2. The free end 7 of each hook lies in an imaginary planar extension of the straight portion 5 of the other hook so that the hooks in effect form a closed loop in end elevation as best seen in FIGURE 5. Each of the hooks 4 tapers progressively from its end adjacent the base 2 to its free end 7 and the lateral spacing between the inboard edges of the arcuate portions 5 is slightly less than the external diameter of the tubular member to be engaged. Having reference now to FIGURES 3 through 5, one will observe that the panel 8 is secured at the inside of the market cart basket by passing the hooks 4 through the oblong slots 9 in the panel and applying pressure against the rear of the base 2 to cause the hooks to snap over the sides of the horizontal rod 10. As depicted in the upper portion of FIGURE 3, the base 2 initially lies at an angle of approximately 60° to the longitudinal axis of the rod 10 and a portion of the base and the tabs 3 bear against the inner surface of the panel to prevent the base 2 from passing through the slot. Thereafter the clip is rotated counterclockwise utilizing a needle-nose pliers or other appropriate tool until the base lies parallel to the longitudinal axis of the rod. Since the vertical distance from the inner surface of the base 2 to the undersurface of the arcuate portions 6 of the hooks is approximately equal to or slightly less than the thickness of the panel 8 plus the diameter of the rod 10 and further since the hooks are formed of resilient sheet metal, the hooks are cammed over the surface of the rod remote from the panel and placed in tension when the clip is rotated and the panel and rod are locked tightly against one another as shown in the lower portion of FIGURE 3 and in FIGURE 5. Overrotation of the clip is prevented by the outboard edges of the straight portions 5 adjacent the base bearing against the panel edges defining the sides of the slots 9.

As best viewed in FIGURE 5, the base 2 and the tabs 3, which present a very low profile, are pressed tightly against the inside surface of the panel 8, thus rendering the clip essentially tamper-proof in that it is extremely difficult to rotate the clip clockwise by hand. Since the clip is smoothly contoured and lies close to both the panel and the rod, the danger of injury to the person or apparel of one using the market cart or damage to merchandise disposed therein is negligible. Further, the pressure exerted on the plastic panel 8 by the base 2 and the tabs 3 is distributed over a relatively large surface area of the panel thereby reducing the likelihood of fracture or cracking adjacent the edges of the slots 9.

While a preferred form of the invention has been described in detail for purposes of illustration, it is anticipated that the clip might be altered or modified, for example, by molding it from a tough, resilient plastic material, without departing from the scope of the invention.

I claim:

1. A rotary operative clip which is particularly adapted for fastening an apertured panel to a rod or the like comprising a base and at least a pair of oppositely directed hooks joined to and extending from the opposite sides of said base, each of said hooks having an arcuate portion overlying said base in spaced relationship thereto and a free end extending toward the plane of said base, the inboard edges of said hooks adjacent said base being laterally spaced, in a direction generally parallel to said sides of said base, a distance substantially less than the diameter of the rod to be engaged, the inboard edges of said arcuate portions of said hooks being laterally spaced, in the aforesaid direction, a distance not greater than the external diameter of the rod to be engaged whereby said hooks are adapted to be passed through the apertured panel and snapped over the rod and said free ends and said arcuate portions of said hooks are adapted to be rotatably cammed over the surface of the rod remote from the panel responsive to a fractional turn of said clip whereby said base is drawn tightly against the surface of the panel remote from the rod.

2. A rotary operative clip according to claim 1 wherein each of said hooks has a generally straight portion extending perpendicularly from said base to said arcuate portion and said free end of each hook lies in an imaginary planar extension of said straight portions whereby said hooks cooperatively provide for a closed loop engagement of the tubular-shaped member.

3. A rotary operative clip according to claim 1 wherein each of said hooks is progressively tapered in width from its end adjacent said base to said free end.

4. A rotary operative clip according to claim 1 wherein said base is flat and generally rectangular in shape.

5. A rotary operative clip according to claim 1 including a pair of planar, panel engaging tabs extending outwardly in opposite directions from said base.

6. An installation comprising a structure formed from a plurality of interconnected tubular rods and an apertured panel secured to said structure by a plurality of rotary operative clips, each of said clips having a base pressed against the surface of said panel remote from said structure and a pair of hooks joined to said base and clamped over the surface of said rods remote from said panel, the hooks of each of said clips extending in opposite directions from opposite sides of said base with the portions of said hooks which extend over the rods being spaced apart a distance approximately equal to the diameter of the rods and the portions of said hooks adjoining said base being spaced apart, in a direction parallel to the longitudinal axis of the engaged rod, a distance less than the diameter of the rod, said hooks having been passed through the apertures in said panel and snapped over the sides of said rods and thereafter rotated through a fractional turn whereby said hooks were cammed over said rods and said panel was drawn tightly against said structure.

References Cited

UNITED STATES PATENTS

| | | | |
|---|---|---|---|
| 1,955,740 | 4/1934 | Dzus | 24—221.2 |
| 2,004,679 | 6/1935 | Tinnerman | 24—73.7 |
| 2,160,298 | 5/1939 | Weber | 24—221.2 |
| 2,386,129 | 10/1945 | Maack | 24—73.7 |
| 3,017,205 | 1/1962 | Williams | 287—49 |
| 3,287,841 | 11/1966 | Spragg et al. | 24—73.7 |

EDWARD C. ALLEN, Primary Examiner.

U.S. Cl. X.R.

24—73, 221; 287—49